(12) United States Patent
Jiang et al.

(10) Patent No.: US 7,968,219 B1
(45) Date of Patent: Jun. 28, 2011

(54) MAGNETICALLY SOFT, HIGH SATURATION MAGNETIZATION LAMINATE OF IRON-COBALT-NITROGEN AND IRON-NICKEL FOR PERPENDICULAR MEDIA UNDERLAYERS

(75) Inventors: Hai Jiang, Fremont, CA (US); Kyusik Sin, Pleasanton, CA (US); Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 62 days.

(21) Appl. No.: 12/033,991

(22) Filed: Feb. 20, 2008

Related U.S. Application Data

(60) Division of application No. 10/854,119, filed on May 25, 2004, now Pat. No. 7,354,664, which is a continuation-in-part of application No. 10/137,030, filed on May 1, 2002, now Pat. No. 6,778,358.

(51) Int. Cl.
*G11B 5/66* (2006.01)
(52) U.S. Cl. .......................... 428/829; 428/821; 428/827
(58) Field of Classification Search .................... None
See application file for complete search history.

(56) References Cited

U.S. PATENT DOCUMENTS

| | | | |
|---|---|---|---|
| 4,589,042 A | 5/1986 | Anderson et al. | |
| 5,006,395 A | 4/1991 | Hori et al. | |
| 5,264,981 A * | 11/1993 | Campbell et al. | ......... 360/125.45 |
| 5,408,377 A | 4/1995 | Gurney et al. | |
| 5,465,185 A | 11/1995 | Heim et al. | |
| 5,606,478 A | 2/1997 | Chen et al. | |
| 5,713,197 A | 2/1998 | Ogawa et al. | |
| 5,766,743 A | 6/1998 | Fujikata et al. | |
| 5,874,010 A | 2/1999 | Tao et al. | |
| 6,118,628 A | 9/2000 | Sano et al. | |
| 6,259,583 B1 | 7/2001 | Fontana, Jr. et al. | |
| 6,335,103 B1 | 1/2002 | Suzuki et al. | |
| 6,338,899 B1 | 1/2002 | Fukuzawa et al. | |
| 6,353,511 B1 | 3/2002 | Shi et al. | |
| 6,449,122 B1 | 9/2002 | Yazawa et al. | |
| 6,490,131 B2 | 12/2002 | Sano et al. | |
| 6,538,845 B1 | 3/2003 | Watanabe et al. | |
| 6,541,065 B1 | 4/2003 | Sasaki et al. | |
| 6,641,935 B1 | 11/2003 | Li et al. | |
| 6,645,647 B1 | 11/2003 | Litvinov et al. | |

(Continued)

OTHER PUBLICATIONS

Soft High Saturation Magnetization (Fe0.7Co0.3)1-xNx Thin Films for Inductive Write Heads, Sun et al, IEEE Transactions on Magnetics, vol. 36, No. 5 Sep. 2000.*

(Continued)

*Primary Examiner* — Mark Ruthkosky
*Assistant Examiner* — Gary Harris

(57) ABSTRACT

A magnetic disk includes a substrate, a soft magnetic underlayer disposed over the substrate, and a media layer disposed over the underlayer. The underlayer includes a first plurality of layers each containing NiFe having an atomic concentration of iron that is at least about thirty percent. The underlayer further includes a second plurality of layers that is interleaved with the first plurality of layers. The second plurality of layers each contain FeCoN having an atomic concentration of iron that is greater than an atomic concentration of cobalt, and having an atomic concentration of nitrogen that is less than the atomic concentration of cobalt. The atomic concentration of nitrogen is less than eight percent. The media layer contains a magnetically hard material having an easy axis of magnetization oriented substantially perpendicular to both the media layer and the underlayer.

6 Claims, 4 Drawing Sheets

U.S. PATENT DOCUMENTS

| | | | |
|---|---|---|---|
| 6,646,827 | B1 | 11/2003 | Khizroev et al. |
| 6,667,118 | B1 | 12/2003 | Chang et al. |
| 6,667,850 | B2 * | 12/2003 | Khan et al. ............... 360/125.5 |
| 6,680,831 | B2 | 1/2004 | Hiramoto et al. |
| 6,713,197 | B2 | 3/2004 | Nakamura et al. |
| 6,714,380 | B2 | 3/2004 | Kawasaki et al. |
| 6,764,778 | B2 | 7/2004 | Saito et al. |
| 6,773,556 | B1 | 8/2004 | Brockie et al. |
| 6,777,066 | B1 | 8/2004 | Chang et al. |
| 6,778,358 | B1 | 8/2004 | Jiang et al. |
| 6,805,966 | B1 | 10/2004 | Formato et al. |
| 6,815,082 | B2 | 11/2004 | Girt |
| 6,835,475 | B2 | 12/2004 | Carey et al. |
| 6,844,724 | B1 | 1/2005 | Peng et al. |
| 6,890,667 | B1 | 5/2005 | Lairson et al. |
| 6,943,041 | B2 | 9/2005 | Sugita et al. |
| 6,970,324 | B2 | 11/2005 | Ikeda et al. |
| 7,008,702 | B2 | 3/2006 | Fukuzawa et al. |
| 7,097,924 | B2 | 8/2006 | Haginoya et al. |
| 7,177,117 | B1 | 2/2007 | Jiang et al. |
| 7,354,664 | B1 | 4/2008 | Jiang et al. |
| 2001/0008712 | A1 | 7/2001 | Yazawa et al. |
| 2002/0008936 | A1 | 1/2002 | Kawasaki et al. |
| 2002/0058161 | A1 | 5/2002 | Yamamoto et al. |
| 2002/0109947 | A1 * | 8/2002 | Khizroev et al. ............. 360/319 |
| 2003/0022023 | A1 * | 1/2003 | Carey et al. ........... 428/694 MM |
| 2003/0197988 | A1 | 10/2003 | Hasegawa et al. |
| 2005/0011590 | A1 | 1/2005 | Kawasaki et al. |

OTHER PUBLICATIONS

B. Viala, et al., "Microstructure and Magnetism in FeTaN Films Deposited in the Nanocrystalline State", Journal of Applied Physics, 80(7), Oct. 1996, pp. 3941-3956.

N.X. Sun, et al., "Microstructure and Soft Magnetic Properties of High Saturation Magnetization Fe-Co-N alloy Thin Films", Materials Research Society Symposium, vol. 614, Apr. 2000, pp. F9.2.1-F9.2.12.

S. Nakagawa, et al., "Improvement of soft magnetism of Fe90Co10 sputtered films by addition of N and Ta", Journal of Applied Physics, 79(8), Apr. 1996, pp. 5156-5158.

C.L. Platt, et al., "Magnetic and Structural Properties of FeCoB Thin Films", IEEE Transactions on Magnetics, vol. 37, No. 4, Jul. 2001, pp. 2302-2304.

E.J. Yun, et al., "Magnetic Properties of RF Diode Sputtered CoxFe100-x Alloy Thin Films", IEEE Transactions on Magnetics, vol. 32, No. 5, Sep. 1996, pp. 4535-4537.

N.X. Sun, et al., "Soft High Saturation Magnetization (Fe0.7 ␣Co0.3)1-xNx Thin Films for Inductive Write Heads", IEEE Transactions on Magnetics, vol. 36, No. 5, Sep. 2000, pp. 2506-2508.

T. Nozawa, et al., "Magnetic Properties of FeCoV Film Sandwiched by Thin Soft-Magnetic Films", IEEE Transactions on Magnetics, vol. 37, No. 4, Jul. 2001, pp. 3033-3038.

X. Liu, et al., "High Moment FeCoNi Alloy Thin Films Fabricated by Pulsed-Current Electrodeposition", IEEE Transactions on Magnetics, vol. 37, No. 4, Jul. 2001, pp. 1764-1766.

S. Wang et al., Improved high moment FeAlN/SiO2 Laminated Materials for Thin Film Recording Heads, IEEE Transactions on Magnetics, vol. 27, Nov. 1991, pp. 4879-4881.

B.D. Cullity, "Introduction to Magnetic Materials", Addison-Wesley, 1972, pp. 148.

Higano et al., "Magnetic Properties of Re-TM-N System", vol . . . Mag-23, No. 5, Sep. 1987.

T. Ichihara et al., "Improvement of the Magnetic Characteristic of Multilayered Ni—Fe thin Films by Supplying External In-Plane Field during Sputtering", IEEE Transactions on Magnetics, vol. 32, No. 5, Sep. 1996, pp. 4582-4584.

S. Nakagawa et al., "Soft Magnetic and Crystallographic Properties of $Ni_{81}Fe_{19}/Co_{67}Cr_{33}$ Multilayers as Backlayers in Perpendicular Recording", IEEE Transactions on Magnetics, vol. 30, No. 4, 1994, pp. 4020-4022.

N.R. Darragh et al., "Observation of Underlayer Domain Noise in Perpendicular Recording Disks", IEEE Transactions on Magnetics, vol. 29, No. 6, Nov. 1993, pp. 3742-3744.

Parkin et al., "Oscillations in Exchange Coupling and Magnetoresistance in Metallic Superlattice Structures: Co/Ru, Co/Cr and Fe/Cr", Phys. Rev. Lett., vol. 64, 1990, pp. 2034.

* cited by examiner

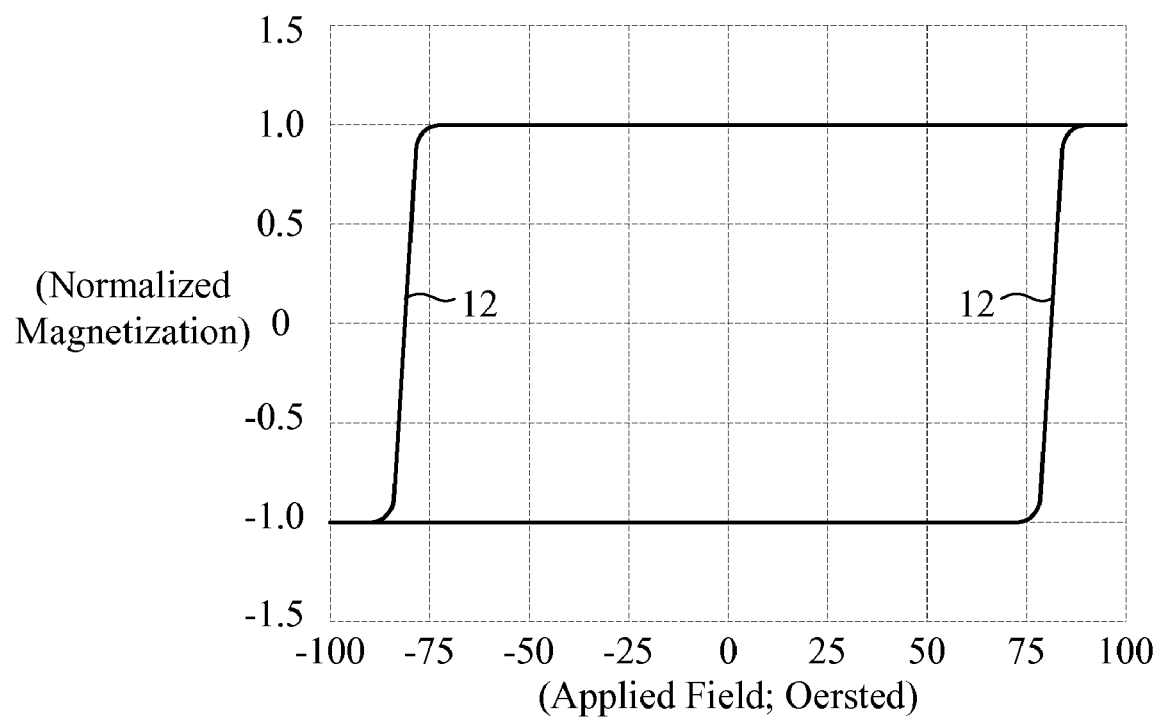
FIG. 7 *(Prior Art)*

MAGNETICALLY SOFT, HIGH SATURATION MAGNETIZATION LAMINATE OF IRON-COBALT-NITROGEN AND IRON-NICKEL FOR PERPENDICULAR MEDIA UNDERLAYERS

CROSS-REFERENCE TO RELATED APPLICATIONS

This application is a divisional of U.S. patent application Ser. No. 10/854,119, filed May 25, 2004, which is a continuation-in-part of U.S. patent application Ser. No. 10/137,030, filed May 1, 2002, now U.S. Pat. No. 6,778,358, granted Aug. 17, 2004, both of which are incorporated by reference herein in their entirety. Also incorporated by reference is U.S. patent application Ser. No. 10/853,416, filed May 24, 2004.

TECHNICAL FIELD

The present invention relates to magnetic media, for example magnetic disks or tapes for information storage systems such as disk or tape drives.

BACKGROUND

Electromagnetic transducers such as heads for disk or tape drives commonly include Permalloy (approximately $Ni_{.81}Fe_{.19}$), which is formed in thin layers to create magnetic features. Permalloy is known to be magnetically "soft," that is, to have high permeability and low coercivity, allowing structures made of Permalloy to act like good conductors of magnetic flux. Disks having a media layer that stores magnetic bits in a direction substantially perpendicular to the media surface, sometimes termed "perpendicular recording," have been proposed to have a soft magnetic underlayer of permalloy or the like.

For example, an inductive head may have conductive coils that induce magnetic flux in an adjacent Permalloy core, that flux employed to magnetize a portion or bit of an adjacent media. That same inductive head may read signals from the media by bringing the core near the magnetized media portion so that the flux from the media portion induces a flux in the core, the changing flux in the core inducing an electric current in the coils. Alternatively, instead of inductively sensing media fields, magnetoresistive (MR) sensors or merged heads that include MR or giant magnetoresistive (GMR) sensors may use thinner layers of Permalloy to read signals, by sensing a change in electrical resistance of the sensor that is caused by the magnetic signal. For perpendicular recording, the soft magnetic underlayer of the disk as well as the soft magnetic core of the head may together form a magnetic circuit for flux that travels across the media layer to write or read information.

In order to store more information in smaller spaces, transducer elements have decreased in size for many years. One difficulty with this deceased size is that the amount of flux that needs to be transmitted may saturate elements such as magnetic pole layers, which becomes particularly troublesome when ends of the pole layers closest to the media, commonly termed pole tips, are saturated. Magnetic saturation in this case limits the amount of flux that is transmitted through the pole tips, limiting writing or reading of signals. Moreover, such saturation may blur that writing or reading, as the flux may be evenly dispersed over an entire pole tip instead of being focused in a corner that has relatively high flux density. For these reasons the use of high magnetic saturation materials (also known as high moment or high $B_s$ materials) in magnetic core elements has been known for many years.

For instance, iron is known to have a higher magnetic moment than nickel, so increasing the proportion of iron compared to nickel generally yields a higher moment alloy. Iron, however, is also more corrosive than nickel, which imposes a limit to the concentration of iron that is feasible for many applications. Also, it is difficult to achieve soft magnetic properties for primarily-iron NiFe compared to primarily-nickel NiFe. Anderson et al., in U.S. Pat. No. 4,589,042, teach the use of high moment $Ni_{.45}Fe_{.55}$ for pole tips. Anderson et al. do not use $Ni_{.45}Fe_{.55}$ throughout the core due to problems with permeability of that material, which Anderson et al. suggest is due to relatively high magnetostriction of $Ni_{.45}Fe_{.55}$.

As noted in U.S. Pat. No. 5,606,478 to Chen et al., the use of high moment materials has also been proposed for layers of magnetic cores located closest to a gap region separating the cores. Also noted by Chen et al. are some of the difficulties presented by these high moment materials, including challenges in forming desired elements and corrosion of the elements once formed. Chen et al. state that magnetostriction is another problem with $Ni_{.46}Fe_{.55}$, and teach the importance of constructing of heads having Permalloy material layers that counteract the effects of that magnetostriction. This balancing of positive and negative magnetostriction with plural NiFe alloys is also described in U.S. Pat. No. 5,874,010 to Tao et al.

Primarily iron FeCo alloys are known to have a very high saturation magnetization but also high magnetostriction that makes them unsuitable for many head applications. That is, mechanical stress during slider fabrication or use may perturb desirable magnetic domain patterns of the head. FIG. 7 shows a B/H loop 12 of a FeCoN layer that was formed by sputtering deposition at room temperature, the layer having a thickness of approximately 500 Å and having a composition of approximately $Fe_{.66}Co_{.28}N_{.06}$. The applied H-field is shown in oersted (Oe) across the horizontal axis while the magnetization of the layer is plotted in normalized units along the vertical axis, with unity defined as the saturation magnetization for a given material. The FeCoN layer has a saturation magnetization ($B_s$) of approximately 24.0 kilogauss and is magnetically isotropic, as shown by the single B/H loop 12. B/H loop 12 also indicates a relatively high coercivity of about 80 oersted, which may be unsuitable for applications requiring soft magnetic properties.

In an article entitled "Microstructures and Soft Magnetic Properties of High Saturation Magnetization Fe—Co—N alloy Thin Films," Materials Research Society, Spring meeting, Section F, April 2000, N. X. Sun et al. report the formation of FeCoN films having high magnetic saturation but also high magnetostriction and moderate coercivity. Sun et al. also report the formation of a thin film structure in which FeCoN is grown on and capped by Permalloy, to create a sandwich structure having reduced coercivity but compressive stress. The magnetostriction of this sandwich structure, while somewhat less than that of the single film of FeCoN, may still be problematic for head applications. Such issues would be expected to grow with increased length of a magnetostrictive layer, so that disk layers that extend many times as far as head layers would appear to be poor candidates for magnetostrictive materials.

SUMMARY

In one embodiment, a magnetic disk is disclosed, comprising a self-supporting substrate; a soft magnetic underlayer disposed over the substrate, the underlayer including a first layer containing NiFe having an atomic concentration of iron that is at least thirty percent and not more than seventy percent, a second layer that adjoins the first layer and contains FeCoN having an atomic concentration of iron that is greater than the second layer's atomic concentration of cobalt, having an atomic concentration of nitrogen that is less than the second layer's atomic concentration of cobalt and less than about three percent; and a media layer disposed over the underlayer and containing a magnetically hard material having an easy axis of magnetization oriented substantially perpendicular to both the media layer and the underlayer.

The underlayer may include a first plurality of layers each containing NiFe having an atomic concentration of iron that is at least about thirty percent; a second plurality of layers that is interleaved with the first plurality of layers, the second plurality of layers each containing FeCoN having an atomic concentration of iron that is greater than an atomic concentration of cobalt, and having an atomic concentration of nitrogen that is less than the atomic concentration of cobalt, the atomic concentration of nitrogen being less than eight percent.

BRIEF DESCRIPTION OF THE DRAWINGS

FIG. 7 is plot of a B/H loop of a prior art FeCoN layer.

DETAILED DESCRIPTION OF THE PREFERRED EMBODIMENT

Figure 1:
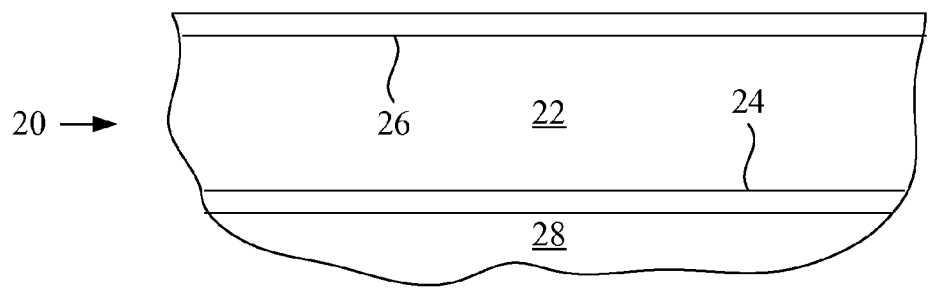
FIG. 1 is a cutaway cross-sectional view of a sandwich structure made of a primarily iron FeCoN layer affixed between a pair of FeNi layers.

FIG. 1 is a cutaway cross-sectional view of a sandwich structure 20 made of an iron-cobalt-nitride (FeCoN) layer 22 affixed between a pair of iron-nickel (FeNi) layers 24 and 26. The sandwich structure 20 is formed on a substrate 28 that provides a smooth surface promoting favorable crystallographic growth of layers 22, 24 and 26. The FeCoN layer 22 has a thickness of approximately 475 Å and has a composition of approximately $Fe_{.69}Co_{.30}N_{.01}$. The FeNi layers 24 and 26 each have a thickness of approximately 25 Å and have a composition of approximately $Ni_{.55}Fe_{.45}$. Layers 22, 24 and 26 were formed by DC magnetron sputtering deposition at room temperature. Magnetron sputtering has a deposition rate that is approximately ten times faster than that of RF sputtering, which is an advantage in commercial applications such as magnetic head production. The substrate may be a silicon dioxide, alumina, chromium, tantalum or titanium, for example.

Figure 2:
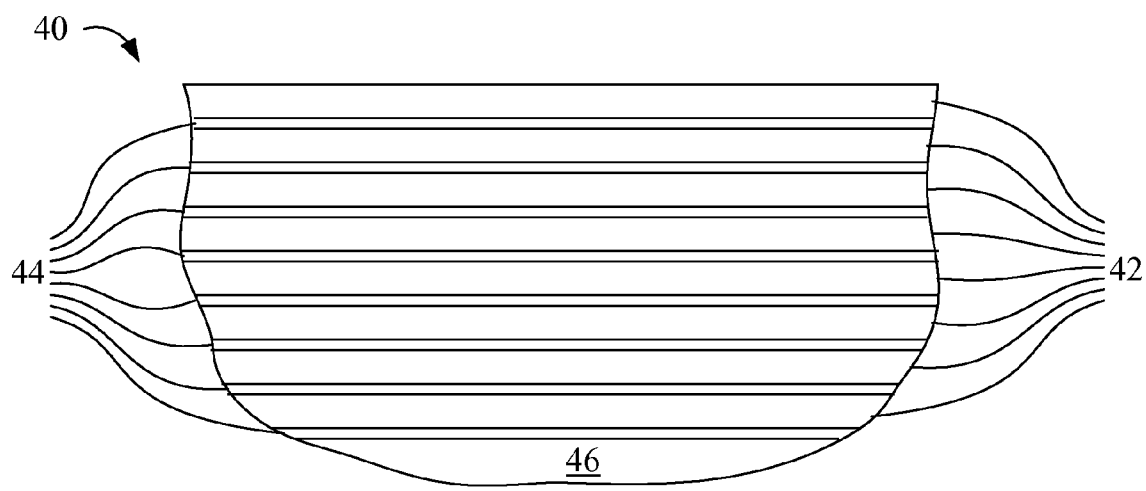
FIG. 2 is a cutaway cross-sectional view of a laminated structure made of a plurality of primarily iron FeCoN layers interleaved with a plurality of primarily iron FeNi layers.

FIG. 2 is a cutaway cross-sectional view of a laminated structure 40 made of a plurality of primarily iron FeCoN layers 42 interleaved with a plurality of primarily iron FeNi layers 44. The sandwich structure 20 is formed on a substrate 46 that provides a surface promoting favorable microstructural growth of layers 42 and 44. The FeCoN layers 42 each have a thickness of approximately 475 Å and a composition of approximately $Fe_{.69}Co_{.30}N_{.01}$. The FeNi layers 42 each have a thickness of approximately 25 Å and have a composition of approximately $Ni_{.55}Fe_{.45}$. Layers 42 and 44 were formed by magnetron sputtering deposition on substrate 46 at room temperature. Various other compositions and thicknesses may also be suitable. For example, the FeCoN layers may have atomic concentrations of iron in a range between 50% and 80%, atomic concentrations of cobalt in a range between 17% and 50%, and atomic concentrations of nitrogen in a range between 0.01% and 3%. As another example, the NiFe layers may have atomic concentrations of iron in a range between 30% and 70%, and atomic concentrations of nickel in a range between 70% and 30%. The thickness of any of the layers may for example be in a range between a few angstroms and one hundred nanometers.

Figure 3:
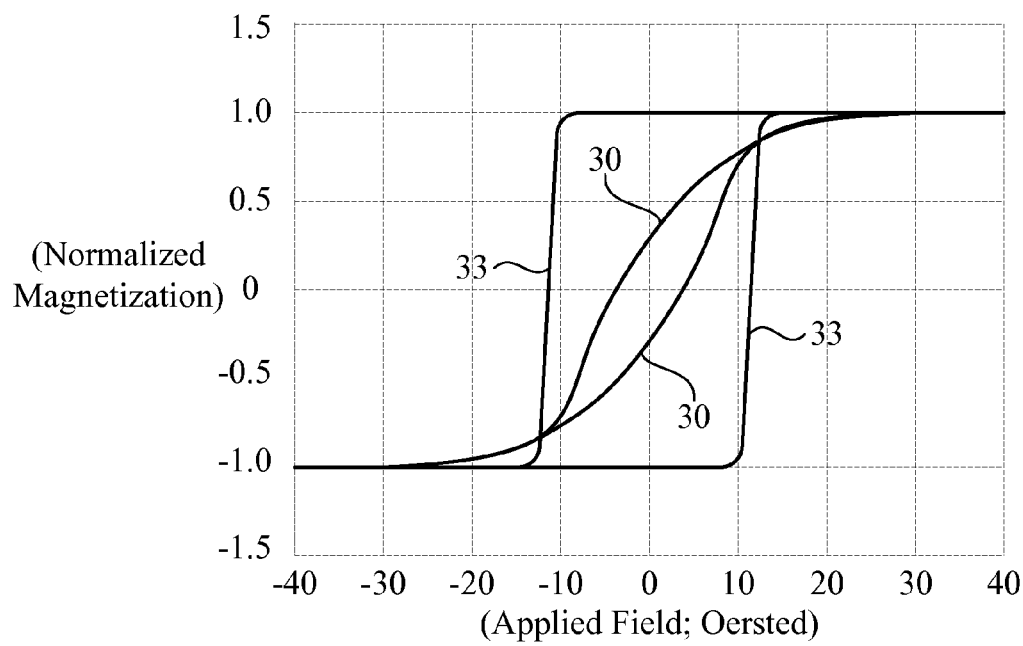
FIG. 3 is plot of a B/H loop of the laminated structure of FIG. 2.

FIG. 3 shows B/H loops 30 and 33 for the laminated structure 40 of FIG. 2 having an overall thickness of about 2500 Å. The laminated structure has a saturation magnetization ($B_s$) of approximately 2.4 tesla (T), nearly that of the single layer of FeCoN. The coercivity of the hard axis, which is defined as the applied field of the loop 30 at which the magnetization is zero, is about 4 oersted (Oe) while the coercivity of the easy axis is about 12 Oe as shown by loop 33. The permeability is approximately 2000, and the laminate has been found to be suitable for applications such as soft magnetic underlayers for magnetic disks.

Figure 4:
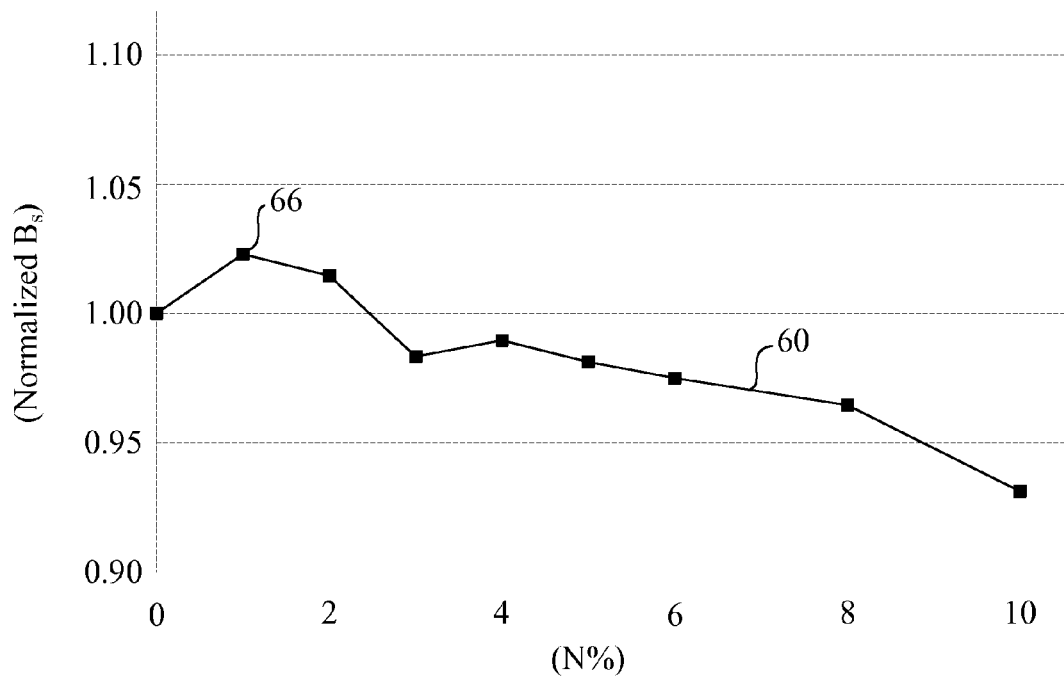
FIG. 4 is a plot of saturation magnetization as a function of nitrogen content for $(Fe_{.70}Co_{.30})N$.

FIG. 4 is a plot 60 of experimentally determined saturation magnetization $B_s$ of FeCoN for various concentrations of nitrogen gas, normalized for zero nitrogen. The plot 60 was generated using a sputtering target of $Fe_{.70}Co_{.30}$ and varying the amount of nitrogen gas. The concentration of nitrogen in the solid layer of FeCoN has been found to be about the same as that in the gas. At the wafer formation level, the concentration of various elements can be determined by Auger Electron Spectroscopy (AES) or Electron Energy Loss Spectroscopy (EELS), while concentrations of various elements of a layer in a completed device such as a magnetic disk can be determined by Transmission Electron Microscopy (TEM). The plot 60 has a peak saturation magnetization $B_s$ at about 1% nitrogen, with $B_s$ generally declining as the nitrogen content is increased above 1%. The coercivity generally increases as the nitrogen content of FeCoN layers declines from approximately 7%, however, arguing against the use of low nitrogen content FeCoN in magnetic disks.

A laminated structure of FeCoN/NiFe having a coercivity below 12 Oe and a $B_s$ above 2.3 T may be desirable for applications such as soft magnetic underlayers for disks. In this case, the magnetically soft, high $B_s$ laminate 40 used in a soft magnetic underlayer of a perpendicular recording disk may include FeCoN with a nitrogen concentration as high as about eight percent. Such a laminated soft magnetic underlayer may be formed entirely of alternating layers of FeCoN and NiFe, which, because of the high $B_s$ compared to traditional underlayers, may have an overall thickness of about 2000 Å or less.

A media layer 158 is disposed over the underlayer 155, the media layer having an easy axis of magnetization that is substantially perpendicular to a major surface 153 of the medium. A thin, physically hard overcoat 156 separates the media layer 158 from the medium surface 153. The medium 150, which may for example be a rigid disk, is moving relative to the head in a direction shown by arrow 159. The head 100 may be spaced from the medium 150 by a nanoscale air bearing, or the head may be in frequent or continuous contact with the medium during operation. The word nanoscale as used herein is meant to represent a size that is most conveniently described in terms of nanometers, e.g., between about one nanometer and about two hundred nanometers.

Figure 5:
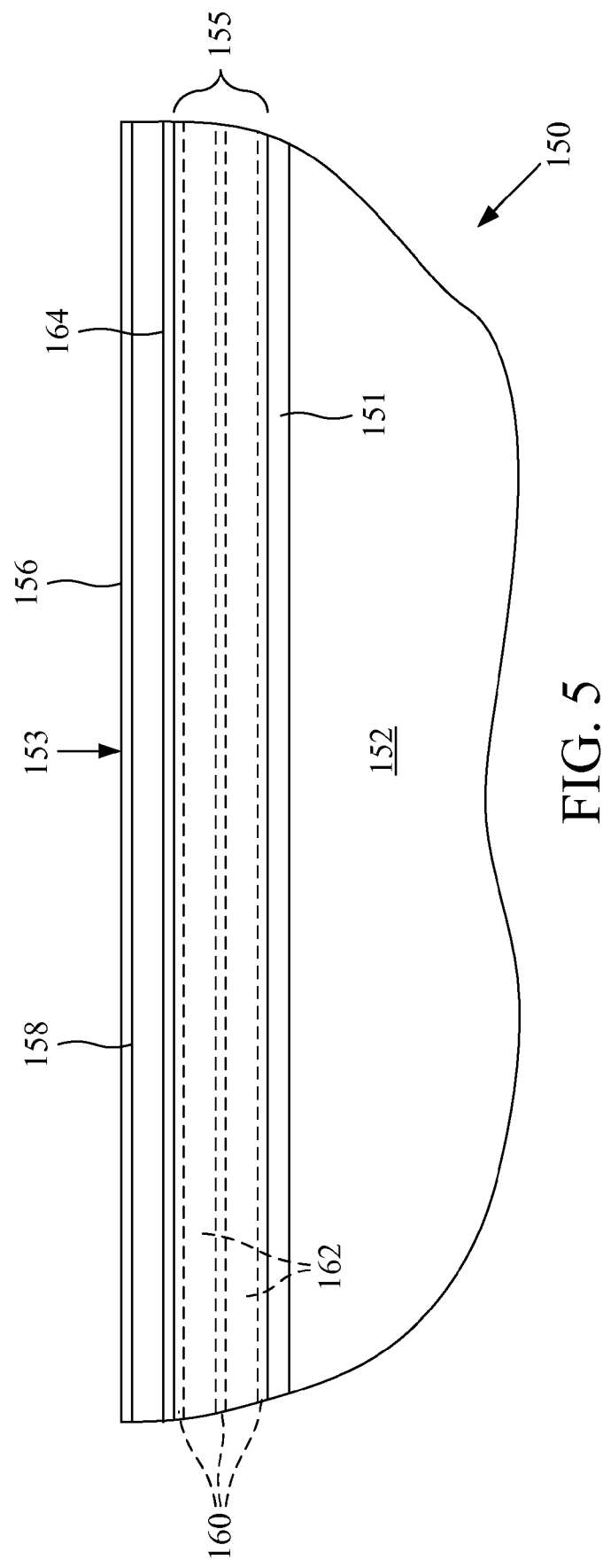
FIG. 5 is a cutaway cross-sectional view of a magnetic disk for perpendicular recording including a soft magnetic underlayer formed of the laminated structure of FIG. 2.

FIG. 5 is a cutaway cross-sectional view of a portion of a medium 150 such as a disk designed for perpendicular storage of data that is written and read by a relatively moving head containing an electromagnetic or electrooptical transducer. The medium 150 includes a substrate 152 that, for the case in which the medium is a disk for a hard disk drive, may be made of glass, aluminum or other materials. The substrate 152 may be textured, or an optional texture layer 151 may provided that promotes favorable growth of a soft magnetic underlayer 155. For example, a substrate 152 of an aluminum-magnesium (AlMg) alloy may be plated with a layer of nickel phosphorous (NiP) to a thickness of about 15 microns that increases the hardness of the substrate and provides a surface suitable for polishing to provide a desired roughness or texture.

A soft magnetic underlayer 155 has been formed of interleaved layers of FeCoN 162 and NiFe 160 similar to that described above, formed to an overall thickness that is in a range between about 1000 Å and 4000 Å. The NiFe layers 160 may contain $Ni_XFe_{(1-X)}$, wherein $0.3 \leq X \leq 0.7$ and FeCoN layers 162 may contain $Fe_YCo_ZN_{(1-Y-Z)}$, wherein $0.5 \leq Y \leq 0.8$ and $0<(1-Y-Z) \leq 0.03$. The underlayer may be thinner than is conventional for perpendicular media, for example less than 2000 Å, due to the relatively high $B_s$ of over 2.3 T. The coercivity of the underlayer 155 may be in a range between about twelve oersted and two oersted.

The soft magnetic underlayer 155 may alternatively contain a plurality of magnetic layers each containing FeCoN that are interleaved with a plurality of much thinner nonmagnetic layers. For example, the underlayer may include a plurality of magnetic layers each containing FeCoN having an atomic concentration of iron that is greater than its atomic concentration of cobalt, and having an atomic concentration of nitrogen that is less than eight percent and less than the atomic concentration of cobalt, the underlayer including a plurality of nonmagnetic layers that are interleaved with the magnetic layers, each of the nonmagnetic layers having a thickness that is less than one-tenth that of an adjoining layer of the magnetic layers. The coupling between adjacent magnetic layers that is provided by the nonmagnetic layers may reduce noise in the underlayer that may otherwise reduce signal integrity.

As an example, the nonmagnetic layers may have a thickness in a range between about eight angstroms and twelve angstroms, although a greater or smaller thickness is possible. The FeCoN layers may each have a thickness in a range between about one hundred angstroms and five hundred angstroms, although a greater or smaller thickness is possible. The underlayer may be thinner than is conventional for perpendicular media, for example less than 2000 Å, due to the relatively high $B_s$ of over 2.3 T. The coercivity of the underlayer 155 may be in a range between about twenty oersted and two oersted.

In one embodiment, the nonmagnetic layers may be chromium or ruthenium, formed to a thickness in a range between about eight angstroms and twelve angstroms so that adjacent magnetic layers are exchange coupled in an antiparallel orientations. This may be termed antiferromagnetic exchange coupling. In this embodiment the underlayer may have a substantially zero net magnetic moment, provided that an even number of magnetic layers of equal thickness is formed, or that the overall thickness of the layers having one magnetic orientation is substantially equal to the overall thickness of the magnetic layers having the opposite orientation.

In one embodiment, the nonmagnetic layers are made of a metal oxide or nitride that induces antiparallel magnetostatic coupling between a pair of adjacent magnetic layers. As an example, the metal oxide or nitride is $Al_XO_{(1-X)}$, $Ta_YO_{(1-Y)}$ or $Al_ZN_{(1-Z)}$. In another embodiment, to induce antiparallel magnetostatic coupling between a pair of adjacent magnetic layers, the nonmagnetic layer can be made of a metal such as Cu, Ti, Ta or NiCr.

A media layer 158 is disposed over the underlayer 155, the media layer having an easy axis of magnetization that is substantially perpendicular to a major surface 153 of the medium 150. The media layer 158 may be formed of a single layer or of multiple layers, for example of cobalt based magnetic alloy layers interleaved with platinum group nonmagnetic layers to enhance perpendicular anisotropy. A nonmagnetic exchange decoupling material may be contained in the media layer or layers to decouple magnetic grains for reducing noise. A nonmagnetic decoupling layer 164, which also serves as a seed layer for the media layer 158, is disposed between the underlayer 155 and the media layer, and may contain for example chromium (Cr) or titanium (Ti). A thin, physically hard overcoat 156 of diamond-like carbon (DLC), tetrahedral-amorphous carbon (ta-C), silicon carbide (SiC) or the like separates the media layer 158 from the medium surface 153. Although not shown, a thin lubricant layer may coat the medium surface 153.

Figure 6:
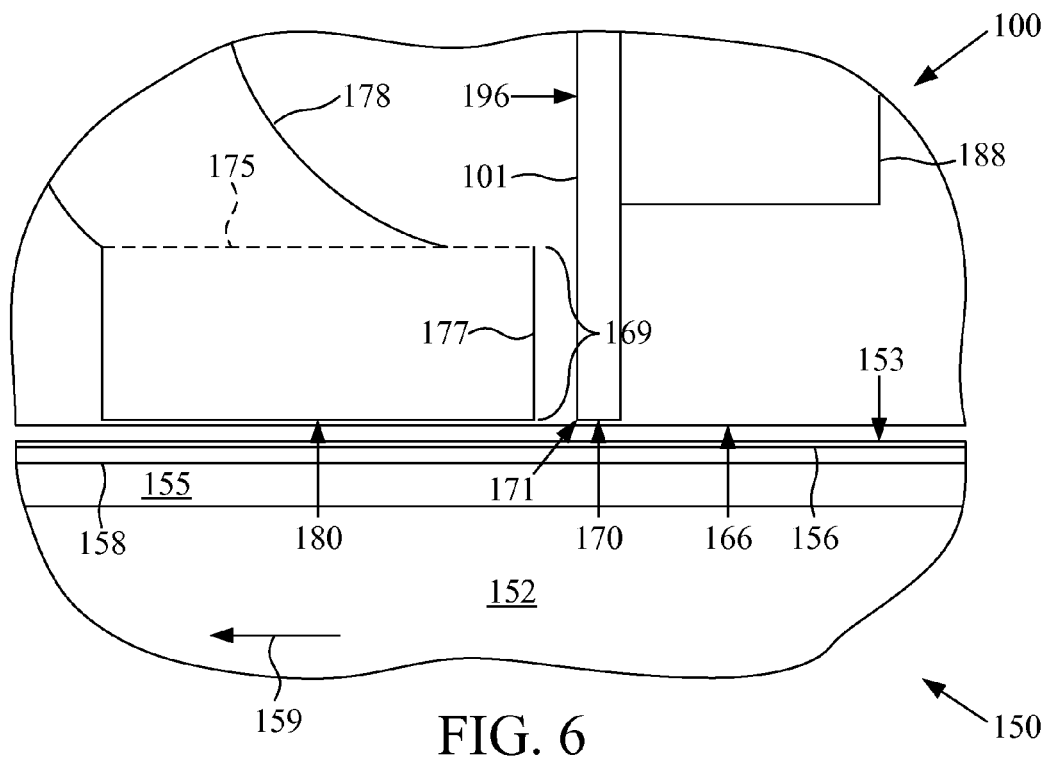
FIG. 6 is a cutaway cross-sectional view of a perpendicular recording head interacting with the disk of FIG. 5.

FIG. 6 is a cutaway cross-sectional view of a magnetic head 100 interacting with the medium 150, which is moving relative to the head in a direction shown by arrow 159. The head 100 has a medium-facing surface 166 disposed adjacent to the medium surface 153. The head 100 may be spaced from the medium 150 by a nanoscale air bearing, or the head may be in frequent or continuous contact with the medium during operation. The word nanoscale as used herein is meant to represent a size that is most conveniently described in terms of nanometers, e.g., between about one nanometer and about two hundred nanometers. The head 100 in this embodiment is designed for perpendicular recording on the medium 150, and includes a laminated write pole layer 101 that terminates adjacent to the medium-facing surface in a first pole tip 170, which may sometimes be called a write pole tip. The write pole layer 101 may be formed of a plurality of layers of FeNi interleaved with a plurality of layers of FeCoN, similar to laminate 40 described above.

A soft magnetic layer 188 adjoins the write pole layer 101 but terminates further from the medium-facing surface 166 than the first pole tip 170, layers 101 and 188 combining to form a write pole. Another soft magnetic layer 178 is magnetically coupled to the write pole layer 101 in a region that is removed from the medium-facing surface and not shown in this figure, and is magnetically coupled to the write pole layer 101 adjacent to the medium-facing surface by a soft magnetic pedestal 175. The pedestal 175 may serve to deflect magnetic flux from traveling exactly perpendicular to the media layer 158, so that perpendicularly oriented bits in the media layer can flip more easily. For this purpose write pole tip corner 171 may be spaced a similar distance from the pedestal as it is from the soft underlayer 155, e.g., on the order of 50-200 nm. The soft magnetic layer 178 and pedestal 175 may be considered to form a return pole layer that terminates adjacent to the medium-facing surface in a second pole tip 180. At least one electrically conductive coil section may be disposed between layers 101 and 178 and another coil section disposed upstream of layer 188, to induce magnetic flux in the pole layers.

Although not apparent in this view, the return pole tip 180 may have an area that is at least two or three orders of magnitude greater than that of the write pole tip 170. Alternatively, another return pole layer and return pole tip may additionally be provided, for example between the write pole layer and a MR sensor. The write pole tip 170 may have a substantially trapezoidal shape that has a maximum track width at a trailing corner 171. The trailing corner 171 of the write pole tip 170 may be approximately equidistant from soft magnetic underlayer 155 and soft magnetic pedestal 175 in this embodiment, to deflect magnetic flux from the write pole. The write pole layer 170 may have a $B_s$ that is between about 2.35 T and 2.45 T, while the soft magnetic pedestal 175 may have a $B_s$ that is substantially less, e.g., less than 2.0 T. A magnetoresistive or magnetooptical sensor may also be included with the head, such a sensor not shown in this view.

The invention claimed is:

1. A magnetic disk comprising:
   a substrate;
   a soft magnetic underlayer disposed over the substrate, the underlayer including a first plurality of layers each containing NiFe having an atomic concentration of iron that is at least about thirty percent, and a second plurality of layers that is interleaved with the first plurality of layers, the second plurality of layers each containing FeCoN having an atomic concentration of iron that is greater than an atomic concentration of cobalt, and having an atomic concentration of nitrogen that is less than the atomic concentration of cobalt, the atomic concentration of nitrogen being less than eight percent; and
   a media layer disposed over the underlayer and containing a magnetically hard material having an easy axis of magnetization oriented substantially perpendicular to both the media layer and the underlayer.

2. The disk of claim 1, wherein each of the layers containing FeCoN is more than ten times thicker than each of the layers containing NiFe.

3. The disk of claim 1, wherein at least one of the layers containing FeCoN has a thickness that is less than thirty angstroms, and wherein at least one of the layers containing NiFe has a thickness that is greater than four hundred angstroms.

4. The disk of claim 1, further comprising a nonmagnetic layer disposed between the underlayer and the media layer.

5. The disk of claim 1, wherein the underlayer has a saturation magnetization of at least 2.3 tesla.

6. The disk of claim 1, wherein the underlayer has a coercivity of not more than twelve oersted.

* * * * *